United States Patent
Chen (10) Patent No.: US 12,287,531 B2
(45) Date of Patent: Apr. 29, 2025

(54) OPTICAL MEMBER DRIVING MECHANISM

(71) Applicant: TDK TAIWAN CORP., Taoyuan (TW)

(72) Inventor: Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 788 days.

(21) Appl. No.: 17/399,420

(22) Filed: Aug. 11, 2021

(65) Prior Publication Data

US 2022/0050261 A1   Feb. 17, 2022

Related U.S. Application Data (60) Provisional application No. 63/071,550, filed on Aug. 28, 2020, provisional application No. 63/065,865, filed on Aug. 14, 2020.

(51) Int. Cl.
| | |
|---|---|
| *G02B 7/182* | (2021.01) |
| *G02B 26/08* | (2006.01) |
| *G02B 26/10* | (2006.01) |

(52) U.S. Cl.
CPC ....... *G02B 7/1821* (2013.01); *G02B 26/0816* (2013.01); *G02B 26/10* (2013.01)

(58) Field of Classification Search
CPC .... G02B 7/1821; G02B 7/182; G02B 7/1822; G02B 7/1827; G02B 7/1828; G02B 26/0816; G02B 26/10; G02B 26/0833; G02B 26/085; G02B 26/101; G02B 26/105; G02B 26/08; G02B 26/0841; G02B 26/0858; G02B 26/0866; G02B 26/0875–0891; G02B 26/103; G02B 26/106; G02B 26/108; B81B 2201/04; B81B 2201/042; B81B 2201/045
See application file for complete search history.

(56) References Cited

U.S. PATENT DOCUMENTS

| | | | |
|---|---|---|---|
| 7,187,483 B1* | 3/2007 | Orcutt | G02B 26/085 359/224.1 |
| 2007/0229932 A1* | 10/2007 | Cho | G02B 26/085 348/E9.026 |
| 2008/0001690 A1* | 1/2008 | Yang | G02B 26/085 335/213 |
| 2010/0002278 A1* | 1/2010 | Maeno | G02B 26/085 359/200.7 |
| 2012/0212790 A1* | 8/2012 | Fehrer | G02B 26/101 359/198.1 |
| 2013/0229698 A1* | 9/2013 | Honda | G02B 26/10 359/199.3 |

(Continued)

*Primary Examiner* — Stephone B Allen
*Assistant Examiner* — Adam W Booher
(74) *Attorney, Agent, or Firm* — Muncy, Geissler, Olds & Lowe, P.C.

(57) ABSTRACT

An optical member driving mechanism is provided, including a movable portion, a fixed portion, a first driving assembly, and a first intermediate assembly. The movable portion is configured to connect an optical member, and is movable relative to the fixed portion. The first driving assembly is configured to provide a first driving force to move the movable portion relative to the fixed portion. When the first driving assembly drives the movable portion to move relative to the fixed portion, the movable portion moves relative to the fixed portion via the first intermediate assembly.

17 Claims, 11 Drawing Sheets

(56) References Cited

U.S. PATENT DOCUMENTS

| | | | |
|---|---|---|---|
| 2016/0238834 A1* | 8/2016 | Erlich | G02B 26/101 |
| 2016/0252726 A1* | 9/2016 | Ishida | G02B 26/101 |
| | | | 345/8 |
| 2022/0197049 A1* | 6/2022 | Sue | G03B 17/17 |

* cited by examiner

OPTICAL MEMBER DRIVING MECHANISM

CROSS REFERENCE TO RELATED APPLICATIONS

This application claims the benefit of U.S. Provisional Application No. 63/065,865, filed Aug. 14, 2020 and U.S. Provisional Application No. 63/071,550, filed Aug. 28, 2020, the entirety of which are incorporated by reference herein.

BACKGROUND OF THE INVENTION

Field of the Invention

The application relates in general to an optical member driving mechanism, and in particular, to an optical member driving mechanism used to drive an optical member to rotate.

Description of the Related Art 3D modeling is the process of calculating and developing a profile of the surface of an object, and is used in a wide variety of fields. For example, 3D modeling can be used in films, video games, 3D models, and virtual reality. 3D modeling usually uses a laser to scan an object. Devices used for scanning and modeling a real object are usually complex and expensive. Some projectors that use a laser as a light source also have the same problem. Therefore, how to address the aforementioned problem has become an important issue.

BRIEF SUMMARY OF INVENTION

To address the deficiencies of conventional products, an embodiment of the invention provides an optical member driving mechanism, including a movable portion, a fixed portion, a first driving assembly, and a first intermediate assembly. The movable portion is configured to connect an optical member, and is movable relative to the fixed portion. The first driving assembly is configured to provide a first driving force to move the movable portion relative to the fixed portion. When the first driving assembly drives the movable portion to move relative to the fixed portion, the movable portion moves relative to the fixed portion via the first intermediate assembly.

In some embodiments, the movable portion comprises a carrier, a frame, and a second intermediate assembly. The carrier is configured to connect the optical member. The first driving assembly is configured to drive the carrier to move relative to the frame. When the first driving assembly drives the carrier to move relative to the frame, the carrier moves relative to the frame via the second intermediate assembly.

In some embodiments, the first driving assembly receives a control signal output from a control assembly, and the control signal comprises a first signal and a second signal. The first signal is input into the first driving assembly to drive the movable portion to move relative to the fixed portion. The second signal is input into the first driving assembly to drive the carrier to move relative to the frame.

In some embodiments, the optical driving assembly further comprises a sensing assembly, configured to detect the movement of the movable portion relative to the fixed portion. The control assembly outputs the first signal according to the sensing result of the sensing assembly. The frequency output from the second signal is the same as the resonance frequency of the carrier relative to the frame. Both the first signal and the second signal are current signal. The first signal is in a first range. The second signal is in a second range. The first range is defined by a first largest current and a first smallest current, and the second range is defined by a second largest current and a second smallest current. The difference between the first largest current and the first smallest current is different from the difference between the second largest current and the second smallest current. The control assembly simultaneously inputs the first signal and the second signal to the first driving assembly. When the first signal is input into the first driving assembly, the first driving assembly drives the movable portion to move relative to the fixed portion in a first frequency, and the first frequency is greater than 1 Hz and less than 1000 Hz. When the second signal is input into the first driving assembly, the first driving assembly drives the carrier to move relative to the frame in a second frequency, and the second frequency is greater than 5000 Hz.

In some embodiments, the second intermediate assembly has a plate structure. The second intermediate assembly comprises metal. The second intermediate assembly is fixedly connected to the carrier. The second intermediate assembly is fixedly connected to the frame. The second intermediate assembly and the carrier are integrally formed in one piece. The optical member driving mechanism does not comprise a sensor that is used to detect the movement of the carrier relative to the frame.

In some embodiments, the fixed portion comprises a base, the second intermediate assembly is disposed between the frame and the base, and the carrier is disposed between the optical member and the base.

In some embodiments, the first intermediate assembly is movable relative to the movable portion or the fixed portion. The first intermediate assembly is merely fixedly connected to the movable portion or merely fixedly connected to the fixed portion. The first intermediate assembly has a ball structure.

In some embodiments, the optical member driving mechanism further comprises a sensing assembly, configured to detect the movement of the movable portion relative to the fixed portion. When the first driving assembly drives the movable portion to move relative to the fixed portion, the movable portion rotates around a first rotation axis, wherein the first intermediate assembly and the sensing assembly are arranged along the first rotation axis. The sensing assembly comprises a position sensor and a position sensing magnet, the position sensor is affixed relative to the fixed portion, and the position sensing magnet is disposed on the movable portion, wherein the position sensor corresponds to the position sensing magnet, and the position sensing magnet is disposed between the position sensor and the first intermediate assembly.

In some embodiments, the first driving assembly comprises a first magnetic member, a first permeability member, and a first coil. The first magnetic member is disposed on the movable portion. The first permeability member is disposed on the fixed portion. The first coil winds around the first permeability member.

In some embodiments, the first permeability member has a C-shaped structure. In detail, the first permeability member comprises a lower section, an upper section, a middle section, a first protruding section, and a second protruding section. The lower section is affixed to the fixed portion and has a top surface. The upper section has a bottom surface. The bottom surface faces the lower section, and the top surface faces the upper section. The middle section is connected to the upper section and the lower section. The first protruding section protrudes from the top surface. The second protruding section protrudes from the bottom surface. The first magnetic member is disposed between the first protruding section and the second protruding section. The first magnetic member has a first magnetic pole and a second magnetic pole opposite to the first magnetic pole, the first magnetic pole faces the first protruding section, and the second magnetic pole faces the second protruding section. As seen from the optical axis of the optical member, the longitudinal axis of the first magnetic member is inclined relative to the longitudinal axis of the upper section.

In some embodiments, the optical member driving mechanism further comprises a second driving assembly, and the first driving assembly and the second driving assembly have rotational symmetry relative to the center of the optical member. The second driving assembly comprises a second magnetic member, a second permeability member, and a second coil. The second magnetic member is disposed on the movable portion. The second permeability member is disposed on the fixed portion. The second coil winds around the first permeability member. The second driving mechanism provides a second driving force to move the movable portion relative to the fixed portion, and the direction of the first driving force is opposite to the direction of the second driving force.

In some embodiments, when the first driving assembly drives the movable portion to move relative to the fixed portion, the movable portion rotates around a first rotation axis. When the first driving assembly drives a carrier of the movable portion to move relative to a frame, the carrier rotates around a second rotation axis, wherein the first rotation axis is substantially perpendicular to the second rotation axis, and the longitudinal axis of the first magnetic member is inclined relative to the first rotation axis and the second rotation axis.

In some embodiments, the optical member driving mechanism further comprises a second driving assembly, and as seen from the optical axis of the optical member, the first driving assembly does not overlap the first rotation axis and the second rotation axis, and the second driving assembly does not overlap the first rotation axis and the second rotation axis. A virtual line passes through the center of the first magnetic member and the center of the second magnetic member, and the virtual line is not parallel to the first rotation axis and the second rotation axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
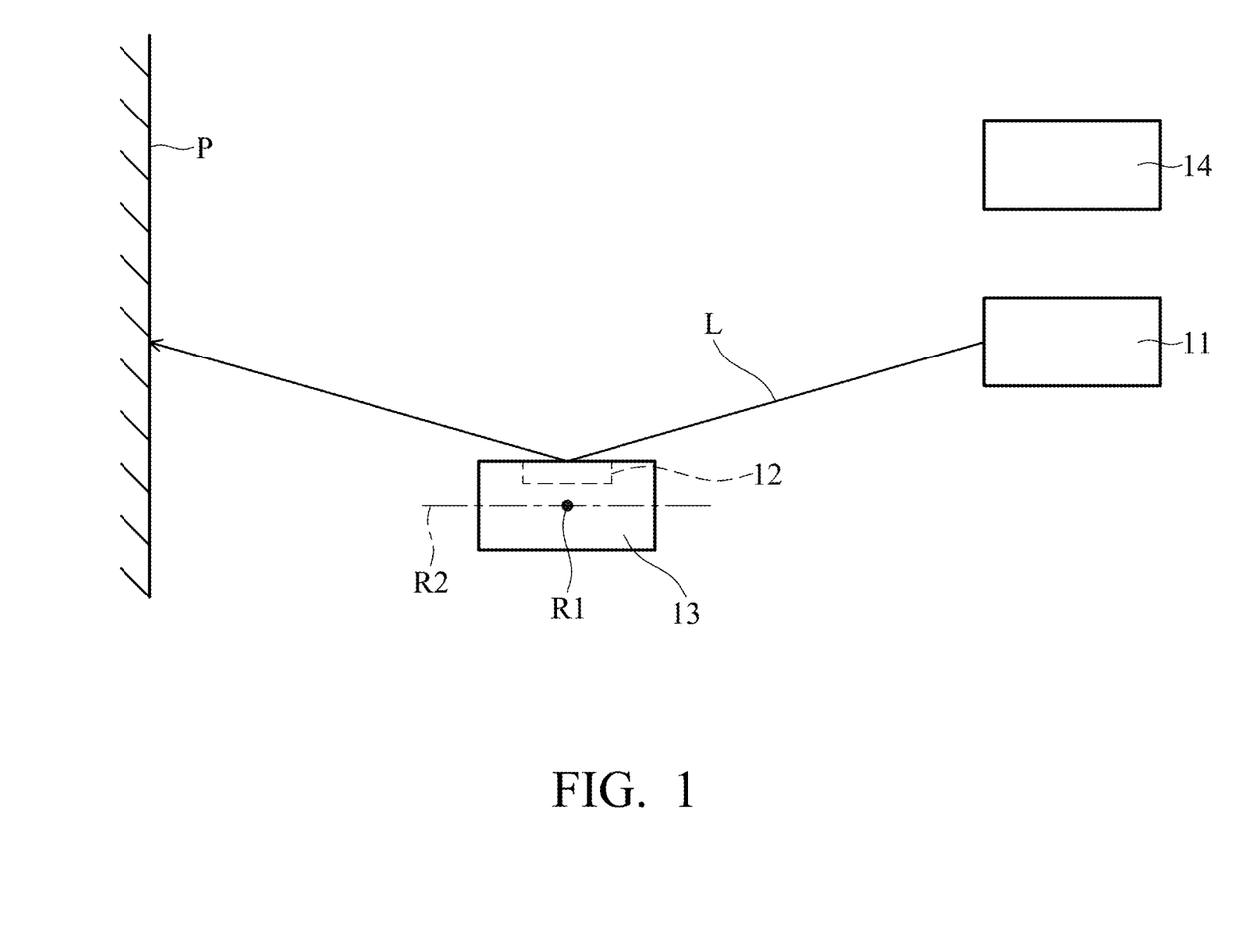
FIG. 1 is a schematic diagram of an optical system according to an embodiment of the invention.

Referring to FIG. 1, in an embodiment, an optical system can be a 3D modeling system and include a laser transmitter 11, an optical member 12, an optical member driving mechanism 13, and a receiver 14. The laser L from the laser transmitter 11 can be reflected to an object P by the optical member 12 (such as a mirror), and the laser L can be then reflected by the object P and received by the receiver 14. The optical member driving mechanism 13 can drive the optical member 12 to rotate around a first rotation axis R1 and a second rotation axis R2, so as to adjust the position of the laser L reaching the object P. Thus, the optical system can scan the entire surface of the object P, and construct the surface undulations of the object P. In some embodiments, the optical system can be a projector, and the receiver 14 can be omitted. The laser L from the laser transmitter 11 can directly project an image on the object P after it reaches the object P (such as a projecting screen).

Figure 2:
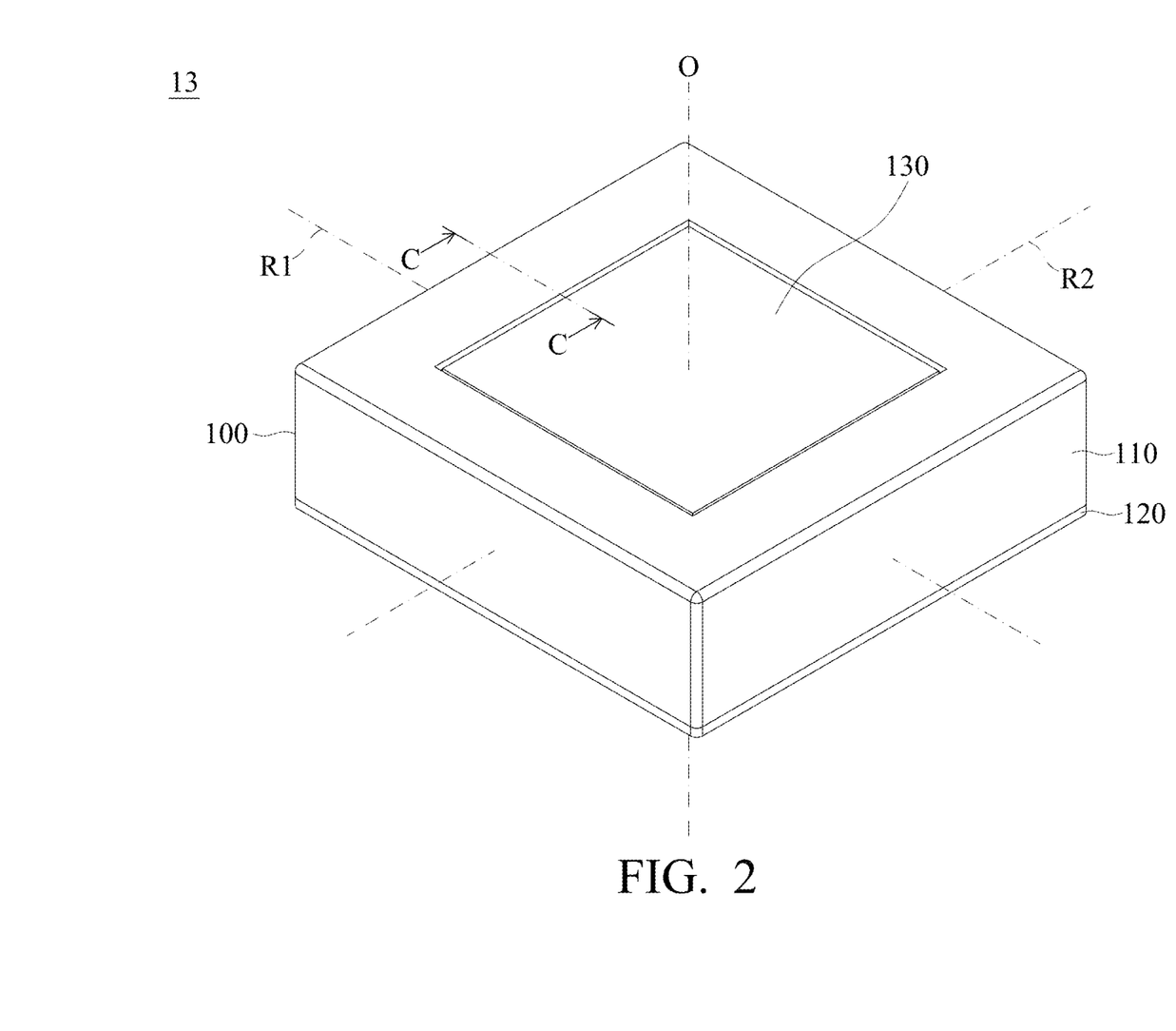
FIG. 2 is a schematic diagram of an optical member driving mechanism according to an embodiment of the invention.
Figure 3:
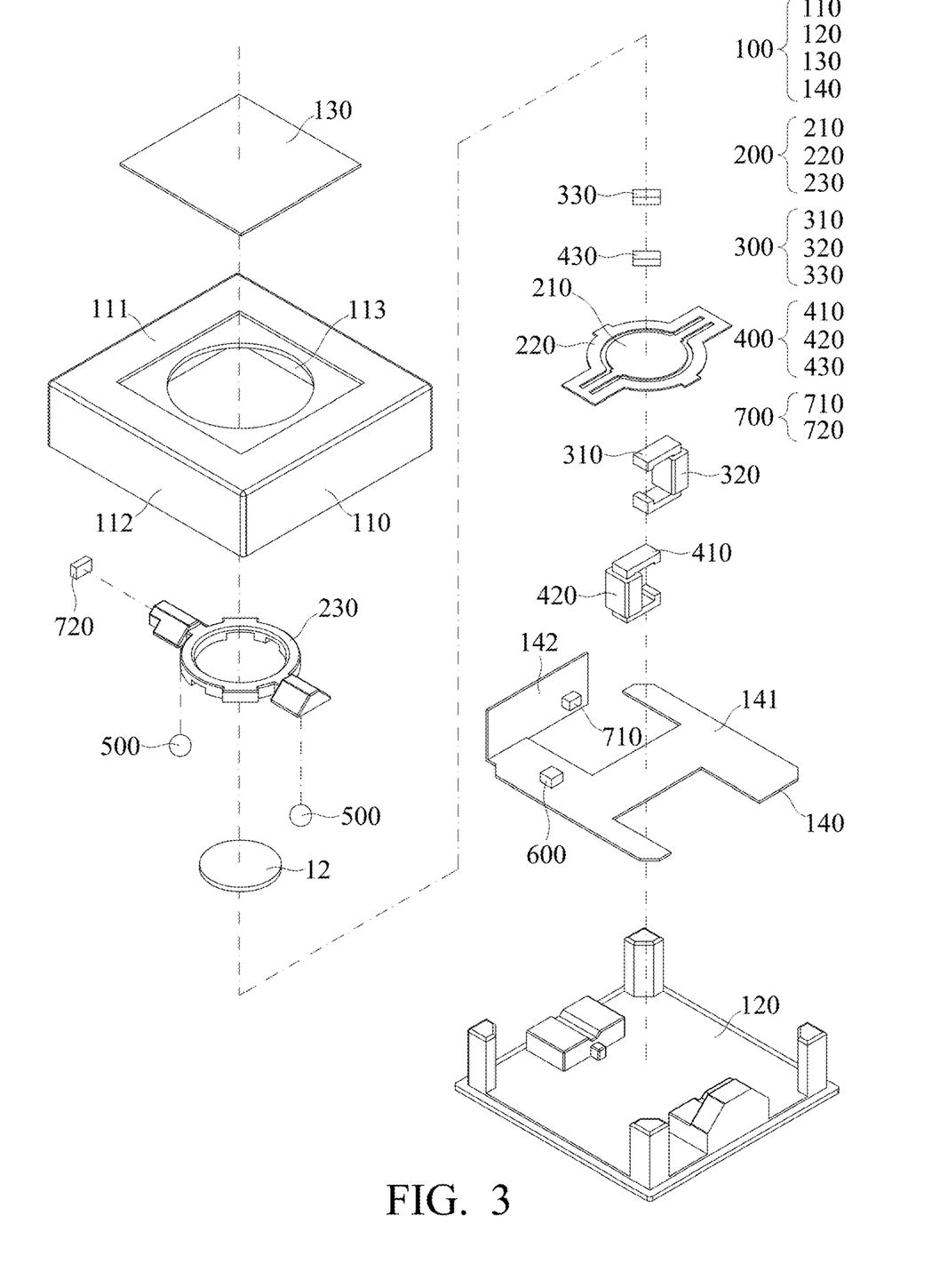
FIG. 3 is an exploded-view diagram of the optical member driving mechanism according to an embodiment of the invention.

FIG. 2 is a schematic diagram of the optical member driving mechanism 13, and FIG. 3 is an exploded-view diagram of the optical member driving mechanism 13. As shown in FIG. 2 and FIG. 3, the optical member driving mechanism 13 primarily includes a fixed portion 100, a movable portion 200, a first driving assembly 300, a second driving assembly 400, at least one first intermediate assembly 500, a control assembly 600, and a sensing assembly 700.

The fixed portion 100 includes a housing 110, a base 120, a transparent plate 130, and a circuit board 140, wherein the housing 110 includes a top wall 111 and a plurality of lateral walls 112. An opening 113 is formed on the top wall 111, and the lateral walls 112 are connected to the edge of the top wall 111 and extended toward the base 120. The housing 110 and the base 120 can be engaged, and an accommodating space can be formed between them. The accommodating space is communicated with an external environment via the opening 113 of the top wall 111. The transparent plate 130 is disposed on the housing 110 and covers the opening 113, so as to prevent the foreign object (such as liquid or dust) in the external environment entering the accommodating space to damage the optical member 12 or the optical member driving mechanism 13. The circuit board 140 is disposed on the base 120 and accommodated in the accommodating space. In this embodiment, the circuit board 140 has two plate sections 141 and 142. The plate section 141 is affixed to the base 120, and the plate section 142 is attached to one of the lateral walls 112. The normal direction of the plate section 141 is substantially perpendicular to that of the plate section 142.

Figure 4:
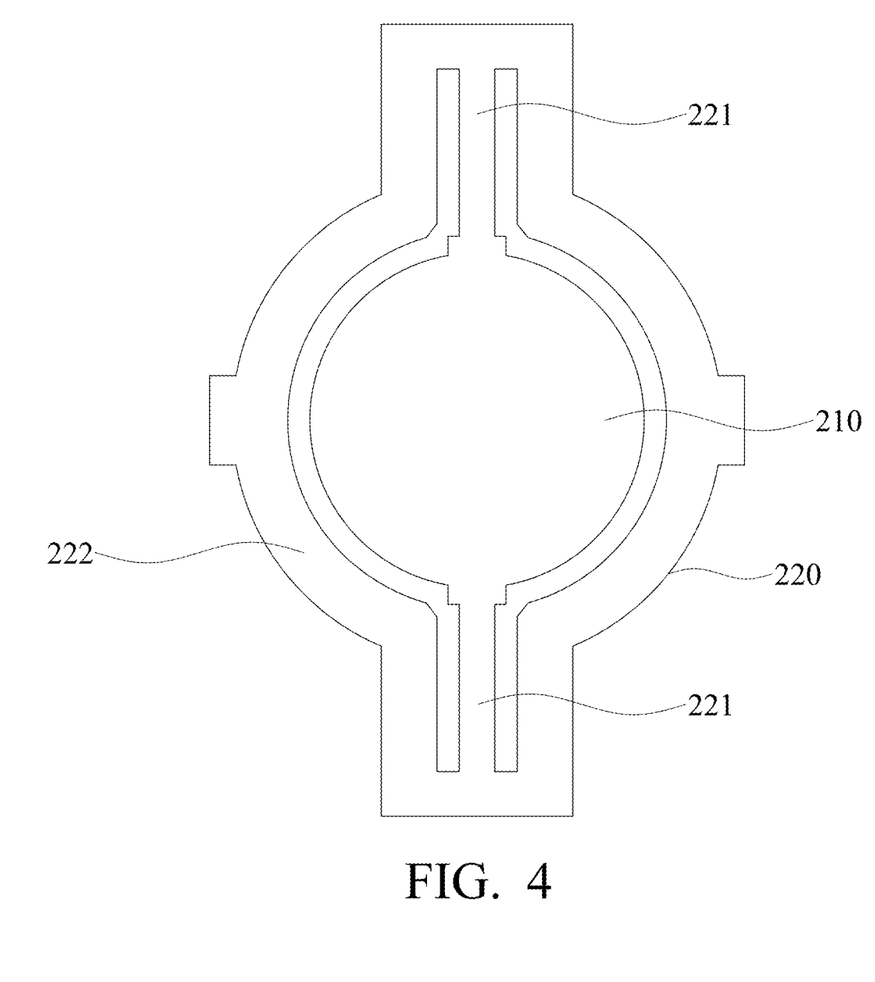
FIG. 4 is a schematic diagram of a carrier and a second intermediate assembly according to an embodiment of the invention.
Figure 5:
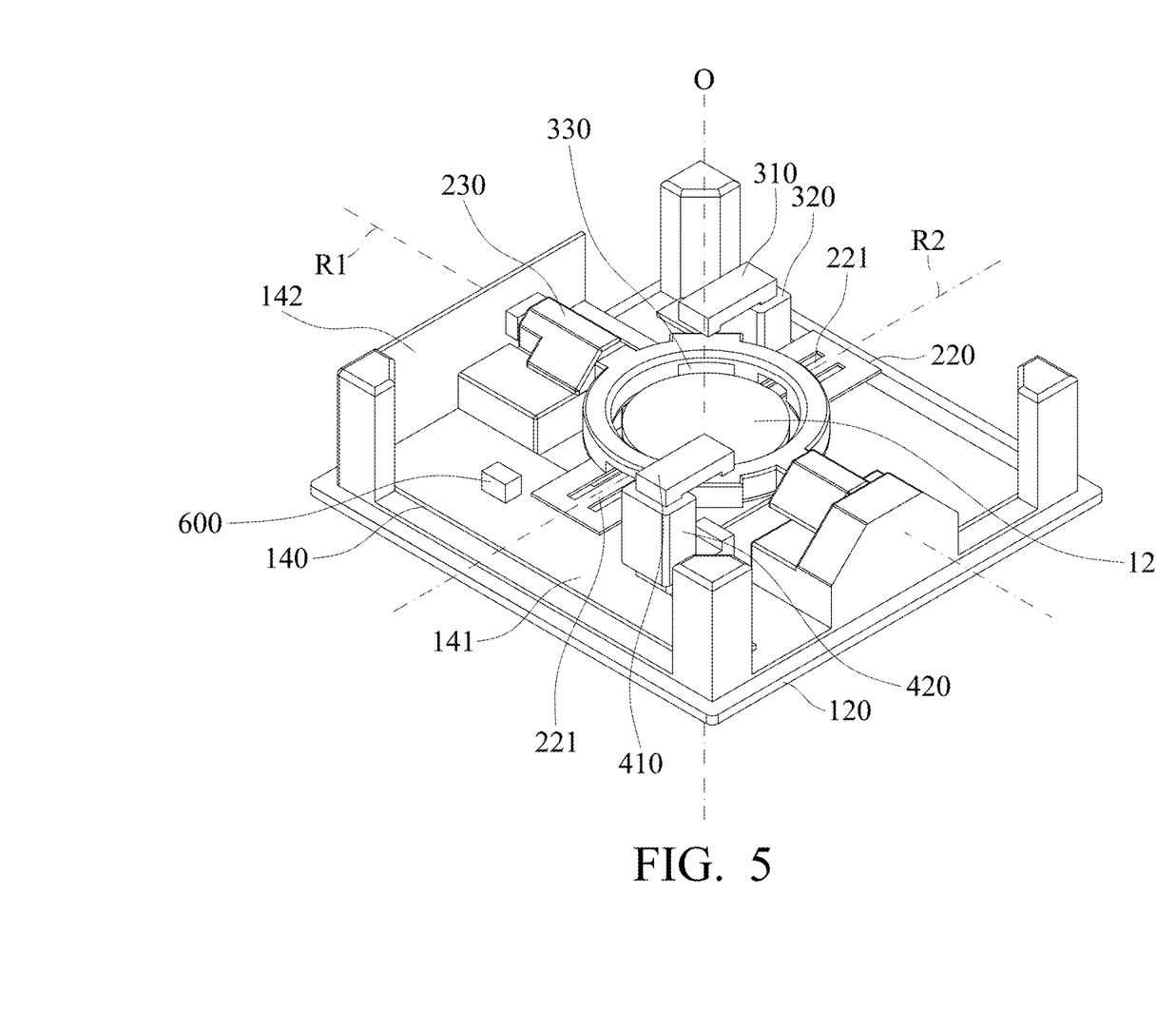
FIG. 5 is a schematic diagram of the optical member driving mechanism according to an embodiment of the invention, wherein the housing and the transparent plate are omitted.

The movable portion 200 includes a carrier 210, a second intermediate assembly 220, and a frame 230. Referring to FIG. 3 and FIG. 4, in this embodiment, the carrier 210 and the second intermediate assembly 220 are integrally formed in one piece, so that they can form a plate-shaped metal sheet. The appearance of the carrier 210 is substantially the same as the appearance of the optical member 12, and the optical member 12 is affixed to the carrier 210.

The second intermediate assembly 220 includes two bridge sections 221 and a surrounding section 222. Each of the bridge sections 221 has a longitudinal structure, and is extended along the second rotation axis R2. One end of each of the bridge sections 221 is connected to the carrier 210. The surrounding section 222 surrounds the carrier 210 and the bridge sections 221, and is connected to another end of each of the bridge sections 221. It should be noted that, except the end of each of the bridge sections 221 connected to the surrounding section 222, the other portions of the surrounding section 222 are separated from the bridge sections 221. The surrounding section 222 is also separated from the carrier 210.

The frame 230 is disposed on the surrounding section 222 of the second intermediate assembly 220, and surrounds the optical member 12. Furthermore, the frame 230 is pivotally connected to the base 120 of the fixed portion 100 via the first intermediate assembly 500. In other words, when the optical member driving mechanism 13 is assembled, the second intermediate assembly 220 is disposed between the frame 230 and the base 120, the carrier 210 is disposed between the optical member 12 and the base 120, and the optical member 12 is exposed from the frame 230.

In this embodiment, the first intermediate assembly has a ball structure, and is rotatable relative to the frame 230 and the base 120. In some embodiments, the first intermediate assembly 500 is affixed to one of the frame 230 and the base 120, and is rotatable relative to the other one of the frame 230 and the base 120. In some embodiments, the first intermediate assembly 500 is a shaft that is pivotally connected to the frame 230 and the fixed portion 100.

Referring to FIGS. 3 and 5-7, the first driving assembly 300 includes a first permeability member 310, a first coil 320, and a first magnetic member 330. The first permeability member 310 has a C-shaped structure, and can be divided into a lower section 311, a middle section 312, an upper section 313, a first protruding section 314, and a second protruding section 315. The lower section 311 is disposed on the base 120. The top surface 311A of the lower section 311 faces the upper section 313, and the bottom surface 313A of the upper surface 313 faces the lower section 311. The middle section 312 is disposed between the upper section 313 and the lower section 311, and connects the upper section 313 to the lower section 311. The first protruding section 314 is connected to the lower section 311, and protrudes from the top surface 311A of the lower section 311. The second protruding section 315 is connected to the upper section 313, and protrudes from the bottom surface 313A of the upper section 313. The first protruding section 314 and the second protruding section 315 are not in contact with each other, and are separated from the middle section 312 of the first permeability member 310.

Figure 6:
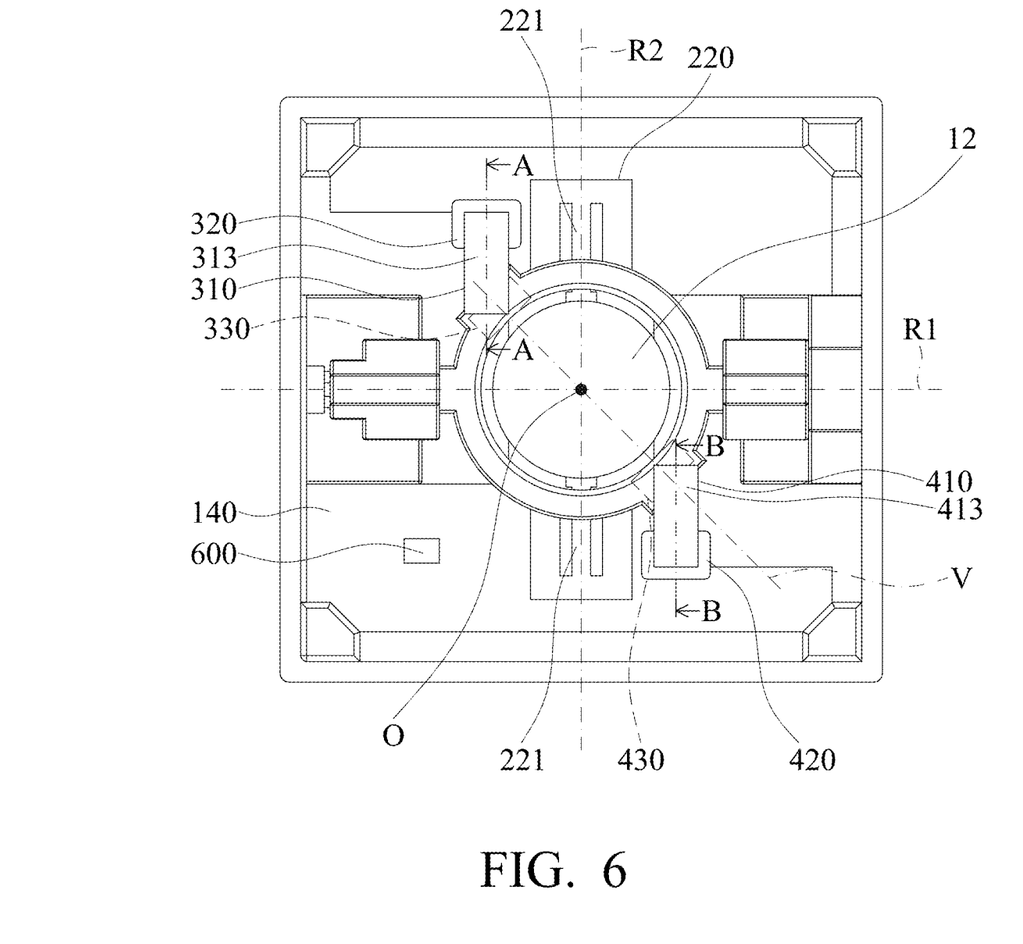
FIG. 6 is a top view of FIG. 5.
Figure 7:
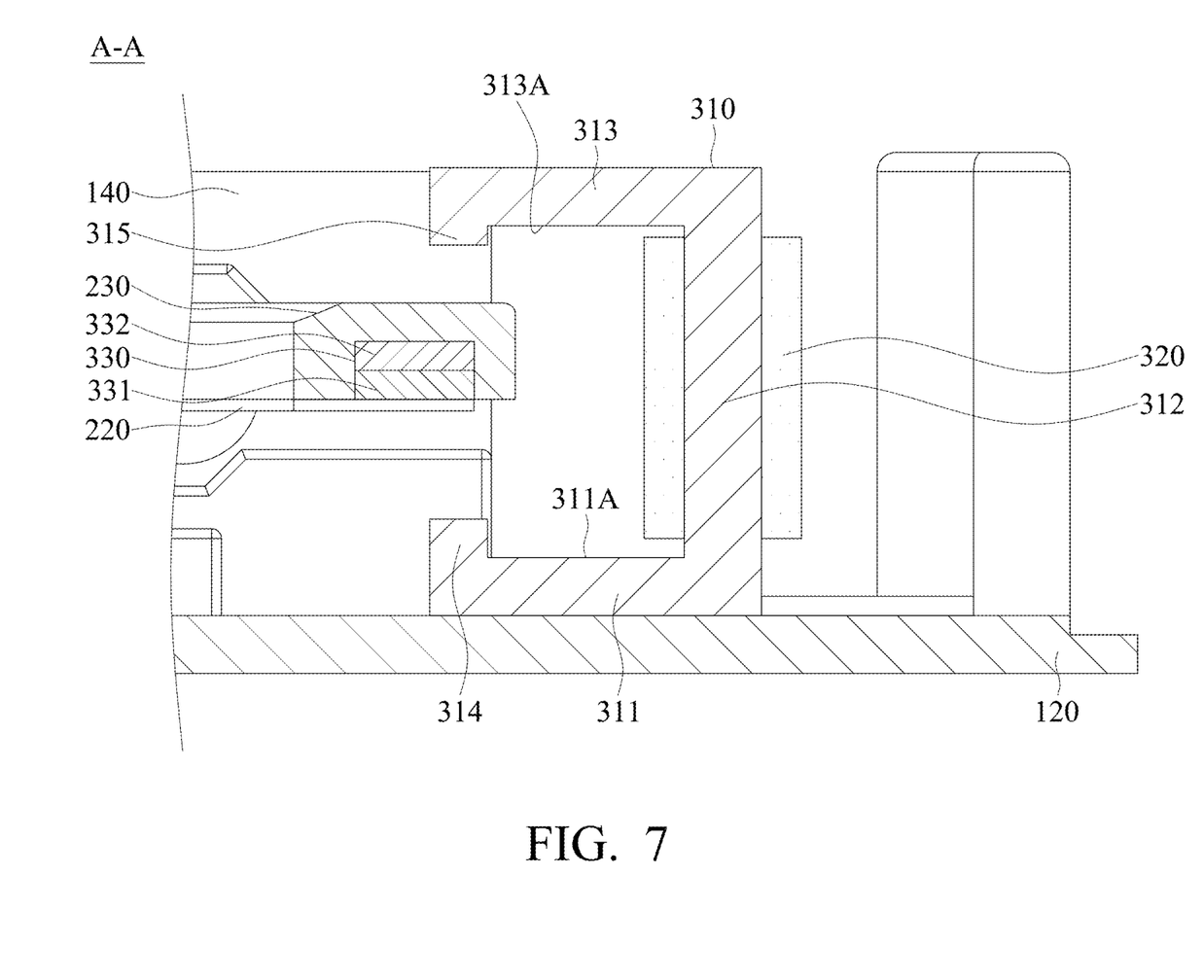
FIG. 7 is a cross-sectional view along line A-A in FIG. 5.

The first coil 320 winds around the middle section 312 of the first permeability member 310, and is electrically connected to the circuit on the circuit board 140. The first magnetic member 330 is disposed on the surrounding section 222 of the second intermediate assembly 220, and is disposed between the second intermediate assembly 220 and the frame 230. Specifically, as shown in FIG. 6, as seen from the optical axis O of the optical member 12, the longitudinal axis of the first magnetic member 330 is not parallel and not perpendicular to the longitudinal axis of the upper section 313. In other words, the longitudinal axis of the first magnetic member 330 is inclined relative to the longitudinal axis of the upper section 313. Moreover, as shown in FIG. 7, when the first driving assembly 300 is assembled, the first magnetic member 330 is disposed between the first protruding section 314 and the second protruding section 315 of the first permeability member 310, and the first magnetic pole 331 (such as N pole) and the second magnetic pole 332 (such as S pole) respectively face the first protruding section 314 and the second protruding section 315.

Referring to FIGS. 3, 5, 6, and 8, the second driving assembly 400 includes a second permeability member 410, a second coil 420, and a second magnetic member 430. The second permeability member 410 has a C-shaped structure, and can be divided into a lower section 411, a middle section 412, an upper section 413, a first protruding section 414, and a second protruding section 415. The lower section 411 is disposed on the base 120. The top surface 411A of the lower section 411 faces the upper section 413, and the bottom surface 413A of the upper surface 413 faces the lower section 411. The middle section 412 is disposed between the upper section 413 and the lower section 411, and connects the upper section 413 to the lower section 411. The first protruding section 414 is connected to the lower section 411, and protrudes from the top surface 411A of the lower section 411. The second protruding section 415 is connected to the upper section 413, and protrudes from the bottom surface 413A of the upper section 413. The first protruding section 414 and the second protruding section 415 are not in contact with each other, and are separated from the middle section 412 of the second permeability member 410.

Figure 8:
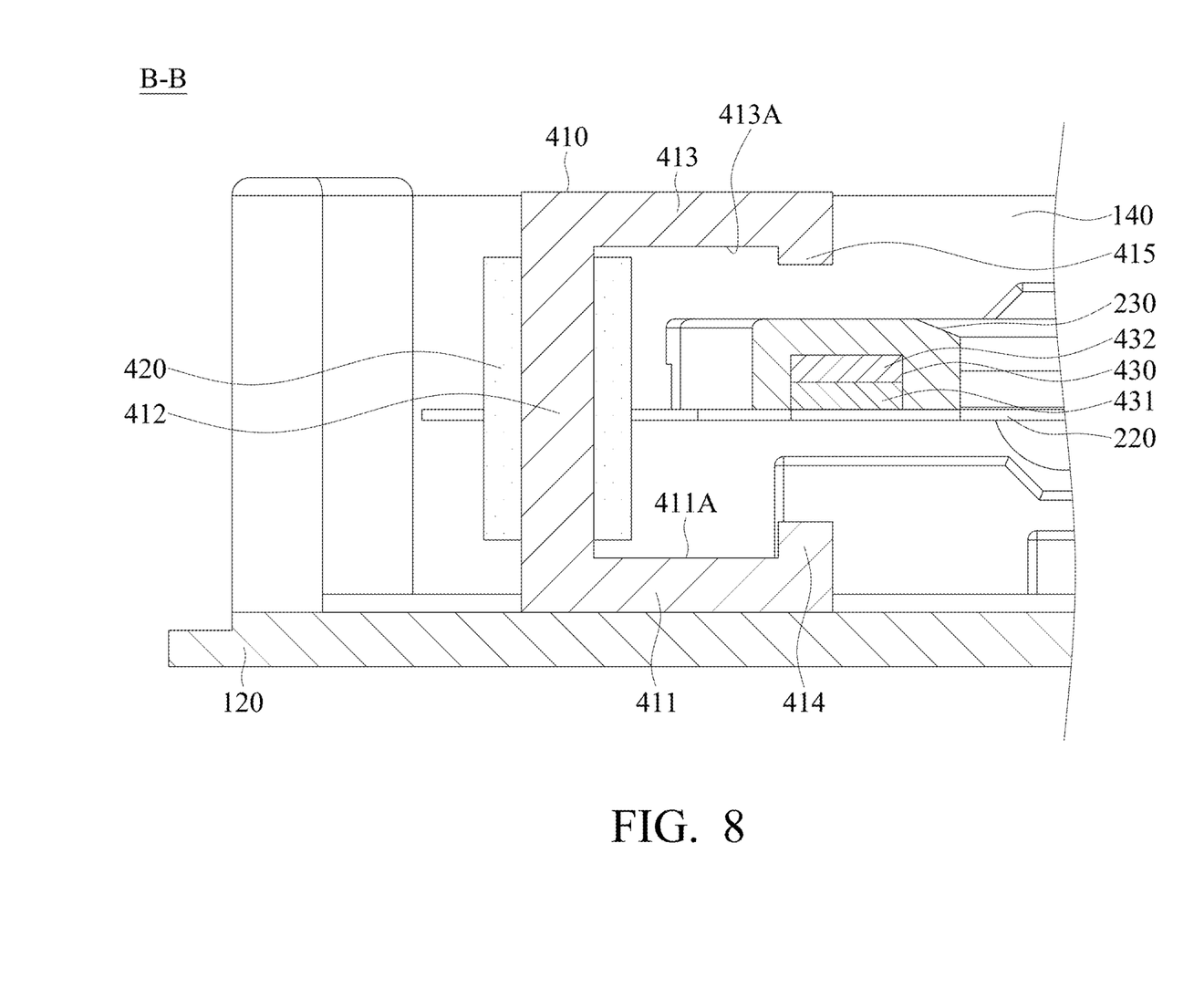
FIG. 8 is a cross-sectional view along line B-B in FIG. 5.

The second coil 420 winds around the middle section 412 of the second permeability member 410, and is electrically connected to the circuit on the circuit board 140. The second magnetic member 430 is disposed on the surrounding section 222 of the second intermediate assembly 220, and is disposed between the second intermediate assembly 220 and the frame 230. Specifically, as shown in FIG. 6, as seen from the optical axis O of the optical member 12, the longitudinal axis of the second magnetic member 430 is not parallel and not perpendicular to the longitudinal axis of the upper section 413. In other words, the longitudinal axis of the second magnetic member 430 is inclined relative to the longitudinal axis of the upper section 413. Moreover, as shown in FIG. 8, when the second driving assembly 400 is assembled, the second magnetic member 430 is disposed between the first protruding section 414 and the second protruding section 415 of the second permeability member 410, and the first magnetic pole 431 (such as N pole) and the second magnetic pole 432 (such as S pole) respectively face the first protruding section 414 and the second protruding section 415.

The control assembly 600 can be an integrated circuit (IC) disposed on the circuit board 140, and can be electrically connected to the first coil 320 and the second coil 420 via the circuit on the circuit board 140. When the user uses the optical member driving mechanism 13 to drive the optical member 12 to rotate, the control assembly 600 transmits the control signal to the first coil 320 and the second coil 420.

In detail, the control signal includes a first signal and a second signal. Both the first signal and the second signal are current signal. When the first signal transmits to the first coil 320 and the second coil 420, the first driving assembly 300 provides a first driving force to the movable portion 200, and the second driving assembly 400 provides a second driving force to the movable portion 200, so that the movable portion 200 can be driven to rotate relative to the fixed portion 100. When the first signal transmits to the first coil 320, the first coil 320 and the first permeability member 310 can form an electromagnet, and a magnetic pushing force (i.e. the first driving force) can be generated between this electromagnet and the first magnetic member 330 to drive the movable portion 200 to move. Similarly, when the first signal transmits to the second coil 420, the second coil 420 and the second permeability member 410 can form an electromagnet, and a magnetic pushing force (i.e. the second driving force) can be generated between this electromagnet and the second magnetic member 430 to drive the movable portion 200 to move.

In this embodiment, the first driving assembly 300 and the second driving assembly 400 have rotational symmetry relative to the center of the optical member 12. As seen from the optical axis O of the optical member 12, the first magnetic member 330 and the second magnetic member 430 do not overlap the first rotation axis R1 and the second rotation axis R2, a virtual line V passing through the center of the first magnetic member 330 and the center of the second magnetic member 430 is not parallel to the first rotation axis R1 and the second rotation axis R2, and the longitudinal axis of the first magnetic member 330 and the longitudinal axis of the second magnetic member 430 are inclined relative to the first rotation axis R1 and the second rotation axis R2. Therefore, the directions of the first driving force and the second driving force generated by the aforementioned method can be opposite, so as to facilitate driving the movable portion 200 to rotate.

Since the first intermediate assembly(s) 500 is arranged along the first rotation axis R1 (such as the two balls in this embodiment) or extended along the first rotation axis R1 (such as a shaft), when the first driving force and the second driving force are applied on the movable portion 200, the movable portion 200 rotates around the first rotation axis R1 relative to the fixed portion 100.

The frequency output from the second signal is the same as the resonance frequency of the carrier 210 or the bridge sections 221 relative to the frame 230. Thus, when the second signal transmits to the first coil 320 and the second coil 420, the resonance phenomena occurs on the carrier 210 or the bridge sections 221, so as to rotate the carrier 210 relative to the frame 230. Since the bridge sections 221 are extended along the second rotation axis R2, when the second signal transmits to the first coil 320 and the second coil 420, the carrier 210 rotates around the second rotation axis R2 relative to the frame 230. In this embodiment, the second rotation axis R2 is substantially perpendicular to the first rotation axis R1.

It should be noted that, since the movement of the carrier 210 relative to the frame 230 is generated by the resonance phenomena, the frequency of this movement is larger than the frequency of the movement of the movable portion relative to the fixed portion 100. For example, in this embodiment, the movable portion 200 can move relative to the fixed portion 100 in a first frequency, and the carrier 210 can move relative to the frame 230 in a second frequency. The first frequency is greater than 1 Hz and less than 1000 Hz, and the second frequency is greater than 5000 Hz.

Figure 9:
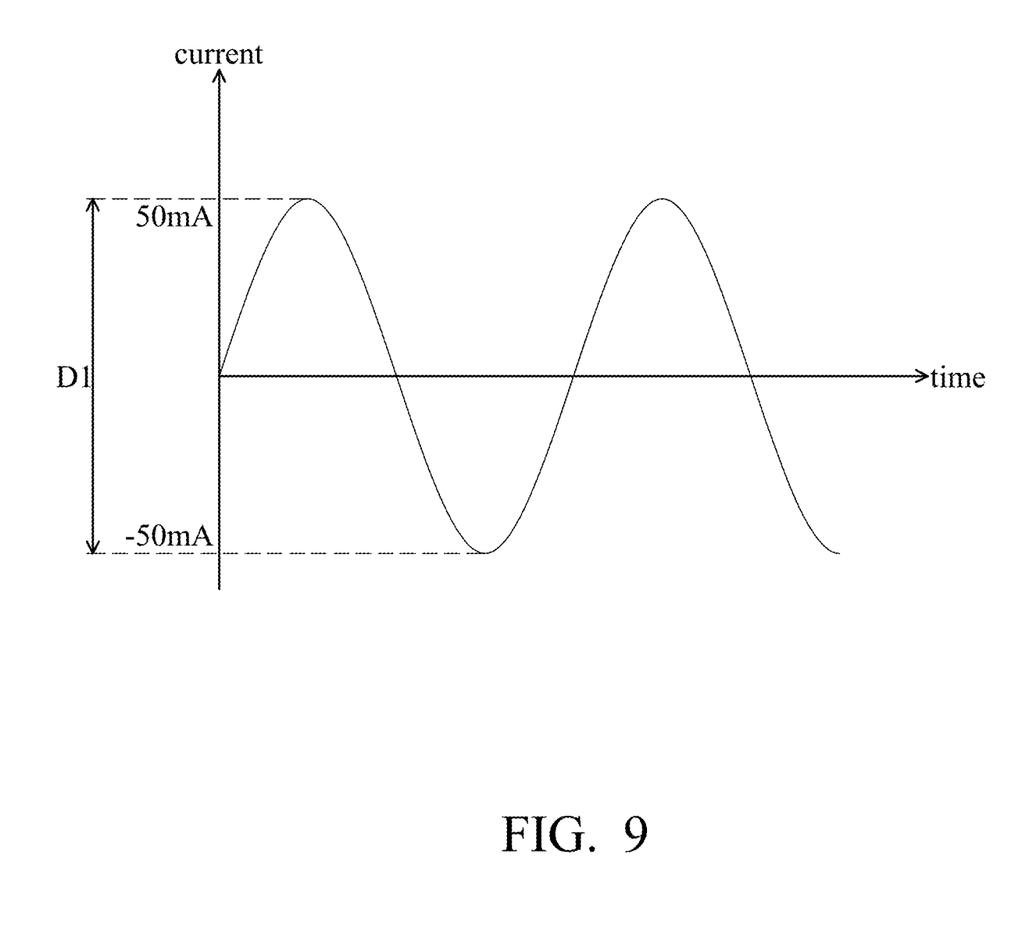
FIG. 9 is a schematic diagram of a first signal according to an embodiment of the invention.

FIG. 9 is a schematic diagram of the first signal in this embodiment. As shown in FIG. 9, in the period of providing the first signal, its largest current is a first largest current, and its smallest current is a first smallest current. In other words, the first signal is in a first range D1 that is between the first largest current and the first smallest current.

Figure 10:
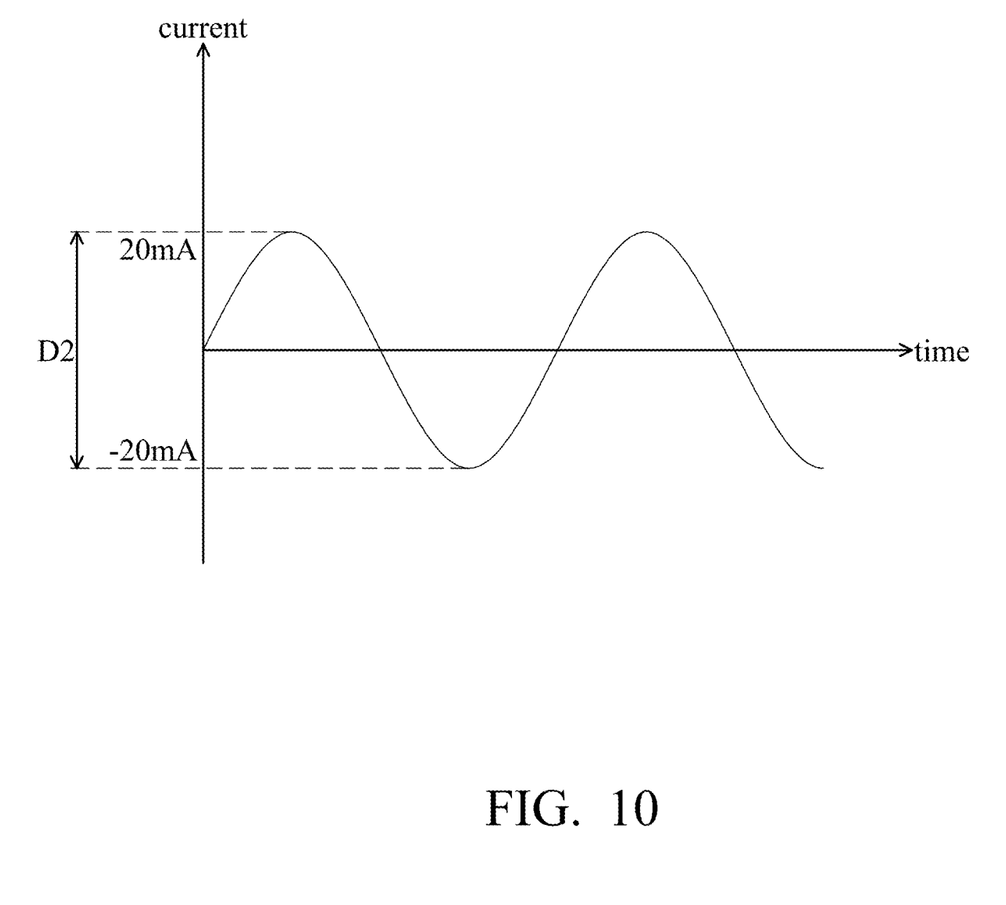
FIG. 10 is a schematic diagram of a second signal according to an embodiment of the invention.

FIG. 10 is a schematic diagram of the second signal in this embodiment. As shown in FIG. 10, in the period of providing the second signal, its largest current is a second largest current, and its smallest current is a second smallest current. In other words, the second signal is in a second range D2 that is between the second largest current and the second smallest current.

The difference between the first largest current and the first smallest current is different from the difference between the second largest current and the second smallest current. In this embodiment, the first largest current is 50 mA, the first smallest current is −50 mA, the second largest current is 20 mA, and the second smallest current is −20 mA. Therefore, the difference between the first largest current and the first smallest current is greater than the difference between the second largest current and the second smallest current.

It should be noted that, in this embodiment, the control assembly 600 simultaneously inputs the first signal and the second signal to the first coil 320 and the second coil 420, so that the optical member 12 can simultaneously rotate around the first rotation axis R1 and the second rotation axis R2.

Figure 11:
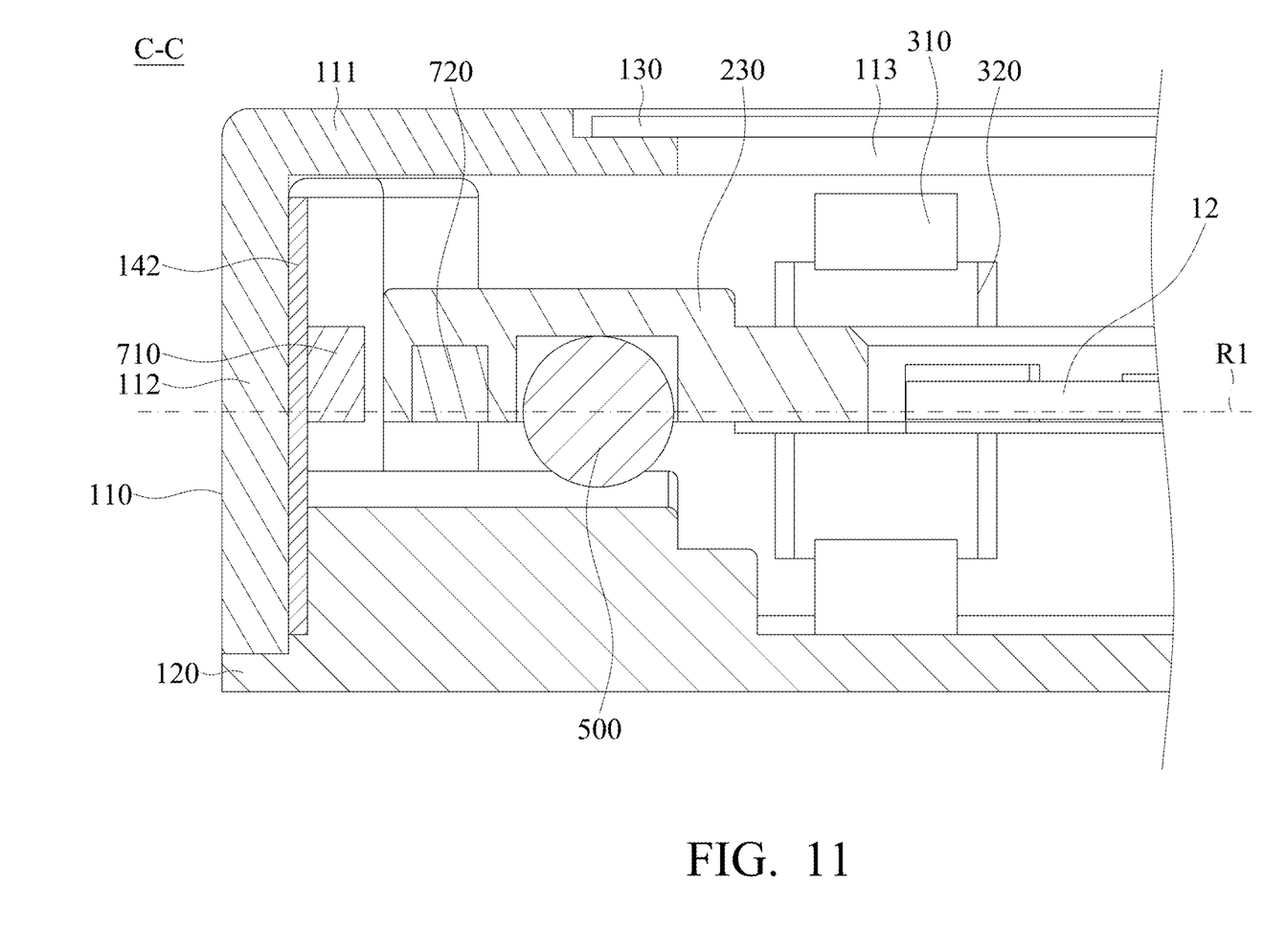
FIG. 11 is a cross-sectional view along line C-C in FIG. 2.

Referring to FIG. 3 and FIG. 11, the sensing assembly 700 includes a position sensor 710 and a position sensing magnet 720. The position sensor 710 and the position sensing magnet 720 are corresponded to each other and respectively disposed on the plate section 142 of the circuit board 140 and the frame 230. The position sensor 720, the position sensing magnet 720, and the first intermediate assembly 500 are arranged along the first rotation axis R1, and the position sensing magnet 720 is disposed between the position sensor 710 and the first intermediate assembly 500. Therefore, when the movable portion 200 rotates around the first rotation axis R1 relative to the fixed portion 100, the position sensor 710 can detect the movement of the movable portion 200 relative to the fixed portion 100 by sensing the magnetic force variation of the position sensing magnet 720.

The position sensor 710 is electrically connected to the control assembly 600 via the circuit on the circuit board 140. Therefore, the control assembly 600 can output the first signal according to the sensing result of the position sensor 710 and control the movement of the movable portion 200 relative to the fixed portion 100. Furthermore, it should be noted that, since the movement of the carrier 210 relative to the frame 230 is generated by the resonance phenomena, the optical member driving mechanism 13 does not need to dispose a sensor to detect the movement of the carrier 210 relative to the frame 230.

In summary, an optical member driving mechanism is provided, including a movable portion, a fixed portion, a first driving assembly, and a first intermediate assembly. The movable portion is configured to connect an optical member, and is movable relative to the fixed portion. The first driving assembly is configured to provide a first driving force to move the movable portion relative to the fixed portion. When the first driving assembly drives the movable portion to move relative to the fixed portion, the movable portion moves relative to the fixed portion via the first intermediate assembly.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
   a movable portion, configured to connect an optical member;
   a fixed portion, wherein the movable portion is movable relative to the fixed portion;
   a first driving assembly, configured to provide a first driving force to move the movable portion relative to the fixed portion; and
   a first intermediate assembly, wherein when the first driving assembly drives the movable portion to move relative to the fixed portion, the movable portion moves relative to the fixed portion via the first intermediate assembly, wherein the first intermediate assembly is movable relative to the movable portion or the fixed portion and has a ball structure, and the ball structure is merely fixedly connected to the movable portion or merely fixedly connected to the fixed portion,
   wherein the movable portion comprises:
      a carrier, configured to connect the optical member;
      a frame, wherein the first driving assembly is configured to drive the carrier to move relative to the frame; and
      a second intermediate assembly, wherein when the first driving assembly drives the carrier to move relative to the frame, the carrier moves relative to the frame via the second intermediate assembly,
   wherein the second intermediate assembly has a plate structure and comprises metal, the second intermediate assembly is fixedly connected to the carrier and the frame, and the second intermediate assembly and the carrier are integrally formed in one piece.

2. The optical member driving mechanism as claimed in claim 1, wherein the first driving assembly receives a control signal output from a control assembly, and the control signal comprises:
   a first signal, input into the first driving assembly to drive the movable portion to move relative to the fixed portion; and
   a second signal, input into the first driving assembly to drive the carrier to move relative to the frame;
   the optical member driving mechanism further comprises a sensing assembly configured to detect a movement of the movable portion relative to the fixed portion, and the control assembly outputs the first signal according to a sensing result of the sensing assembly;
   a frequency output from the second signal is the same as a resonance frequency of the carrier relative to the frame;
   the first signal is in a first range;
   the second signal is in a second range;
   the first signal is a current signal;
   the second signal is a current signal;
   the first range is defined by a first largest current and a first smallest current;
   the second range is defined by a second largest current and a second smallest current;
   a difference between the first largest current and the first smallest current is different from a difference between the second largest current and the second smallest current;
   the control assembly simultaneously inputs the first signal and the second signal to the first driving assembly;
   when the first signal is input into the first driving assembly, the first driving assembly drives the movable portion to move relative to the fixed portion in a first frequency, and the first frequency is greater than 1 Hz and less than 1000 Hz;
   when the second signal is input into the first driving assembly, the first driving assembly drives the carrier to move relative to the frame in a second frequency, and the second frequency is greater than 5000 Hz.

3. The optical member driving mechanism as claimed in claim 1, wherein
   the optical member driving mechanism does not comprise a sensor that is used to detect a movement of the carrier relative to the frame.

4. The optical member driving mechanism as claimed in claim 1, wherein the optical member driving mechanism further comprises a sensing assembly, configured to detect a movement of the movable portion relative to the fixed portion.

5. The optical member driving mechanism as claimed in claim 4, wherein when the first driving assembly drives the movable portion to move relative to the fixed portion, the movable portion rotates around a first rotation axis, wherein the first intermediate assembly and the sensing assembly are arranged along the first rotation axis.

6. The optical member driving mechanism as claimed in claim 4, wherein the sensing assembly comprises a position sensor and a position sensing magnet, the position sensor is affixed relative to the fixed portion, and the position sensing magnet is disposed on the movable portion, wherein the position sensor corresponds to the position sensing magnet, and the position sensing magnet is disposed between the position sensor and the first intermediate assembly.

7. The optical member driving mechanism as claimed in claim 1, wherein the first driving assembly comprises:
- a first magnetic member, disposed on the movable portion;
- a first permeability member, disposed on the fixed portion; and
- a first coil, winding around the first permeability member.

8. The optical member driving mechanism as claimed in claim 7, wherein the first permeability member has a C-shaped structure.

9. The optical member driving mechanism as claimed in claim 7, wherein the first permeability member comprises:
- a lower section, affixed to the fixed portion and having a top surface;
- an upper section, having a bottom surface, wherein the bottom surface faces the lower section, and the top surface faces the upper section;
- a middle section, connected to the upper section and the lower section;
- a first protruding section, protruding from the top surface; and
- a second protruding section, protruding from the bottom surface, wherein the first magnetic member is disposed between the first protruding section and the second protruding section.

10. The optical member driving mechanism as claimed in claim 9, wherein the first magnetic member has a first magnetic pole and a second magnetic pole opposite to the first magnetic pole, the first magnetic pole faces the first protruding section, and the second magnetic pole faces the second protruding section.

11. The optical member driving mechanism as claimed in claim 9, wherein as seen from an optical axis of the optical member, a longitudinal axis of the first magnetic member is inclined relative to a longitudinal axis of the upper section.

12. The optical member driving mechanism as claimed in claim 7, wherein the optical member driving mechanism further comprises a second driving assembly, and the first driving assembly and the second driving assembly have rotational symmetry relative to a center of the optical member.

13. The optical member driving mechanism as claimed in claim 12, wherein the second driving assembly comprises:
- a second magnetic member, disposed on the movable portion;
- a second permeability member, disposed on the fixed portion; and
- a second coil, winding around the first permeability member, wherein the second driving assembly provides a second driving force to move the movable portion relative to the fixed portion, and a direction of the first driving force is opposite to a direction of the second driving force.

14. The optical member driving mechanism as claimed in claim 7, wherein when the first driving assembly drives the movable portion to move relative to the fixed portion, the movable portion rotates around a first rotation axis, and when the first driving assembly drives a carrier of the movable portion to move relative to a frame, the carrier rotates around a second rotation axis, wherein the first rotation axis is substantially perpendicular to the second rotation axis, and a longitudinal axis of the first magnetic member is inclined relative to the first rotation axis and the second rotation axis.

15. The optical member driving mechanism as claimed in claim 14, wherein the optical member driving mechanism further comprises a second driving assembly, and as seen from an optical axis of the optical member, the first driving assembly does not overlap the first rotation axis and the second rotation axis, and the second driving assembly does not overlap the first rotation axis and the second rotation axis.

16. The optical member driving mechanism as claimed in claim 14, wherein a virtual line passes through a center of the first magnetic member and a center of the second magnetic member, and the virtual line is not parallel to the first rotation axis and the second rotation axis.

17. An optical member driving mechanism, comprising:
- a movable portion, configured to connect an optical member;
- a fixed portion, wherein the movable portion is movable relative to the fixed portion;
- a first driving assembly, configured to provide a first driving force to move the movable portion relative to the fixed portion; and
- a first intermediate assembly, wherein when the first driving assembly drives the movable portion to move relative to the fixed portion, the movable portion moves relative to the fixed portion via the first intermediate assembly, wherein the first intermediate assembly is movable relative to the movable portion or the fixed portion and has a ball structure, and the ball structure is merely fixedly connected to the movable portion or merely fixedly connected to the fixed portion,
- wherein the movable portion comprises:
  - a carrier, configured to connect the optical member;
  - a frame, wherein the first driving assembly is configured to drive the carrier to move relative to the frame; and
  - a second intermediate assembly, wherein when the first driving assembly drives the carrier to move relative to the frame, the carrier moves relative to the frame via the second intermediate assembly,
- wherein the fixed portion comprises a base, the second intermediate assembly is disposed between the frame and the base, and the carrier is disposed between the optical member and the base.

* * * * *